3,444,141
ADDITION OF PHENOL CARBONATE DERIVATIVES IN POLYESTER CONDENSATION
Takeo Shima, Iwakuni-shi, Japan, assignor to Teijin Limited, Osaka, Japan, a corporation of Japan
No Drawing. Continuation-in-part of application Ser. No. 374,266, June 11, 1964. This application Mar. 20, 1967, Ser. No. 624,179
Claims priority, application Japan, June 19, 1963, 38/30,925
Int. Cl. C08g *17/003, 17/00*
U.S. Cl. 260—75                 8 Claims

ABSTRACT OF THE DISCLOSURE

A process for preparing a substantially linear highly polymerized carboxylic acid ester, said process characterized by the addition of a carbonate derivative of a monovalent phenol selected from the formula

and

wherein Y and Z are selected from the group consisting of lower alkyl, naphthyl, cyclohexyl, phenyl and substituted phenyl groups and X is selected from the group consisting of halogen atoms and thio-organic radicals of the formula Y—S, at least Y or Z being a phenyl, naphthyl, or substituted phenyl radical; to a molten polyester having an intrinsic viscosity of at least 0.2 as calculated from the measured value in orthochlorophenol.

---

This application is a continuation-in-part of co-pending application Ser. No. 374,266 filed June 11, 1964, now abandoned.

This invention relates to an improved process for the preparation of polyesters by melt polymerization. More particularly, this invention relates to the quick preparation of substantially linear polyesters by esterification of a dibasic acid component with 1,2- or 1,3-glycols as the glycol component, or by self-condensation of glycol esters of hydroxy acids.

Production of polyesters from dibasic acids and dihydric alcohols is well known. For example, it is known that by the reaction of one or more of aliphatic dicarboxylic acids such as succinic, adipic and sebacic acids, and aromatic dicarboxylic acids such as terephthalic, isophthalic, diphenyl-4,4'-dicarboxylic, naphthalene-2,6-dicarboxylic, diphenylether-4,4'-dicarboxylic, diphenylsulfone - 4,4' - dicarboxylic, diphenylmethane-4,4'-dicarboxylic, and diphenoxyethane-4,4'-dicarboxylic acids, with 1,2-, or 1,3-glycols, polyesters are formed, and that these polyesters are useful as the starting materials for fiber and film. It is again known that as the 1,2-glycols, among aliphatic and cycloaliphatic dihydric alcohols, those having hydroxyl groups bonded each to the adjacent carbon atoms, such as ethylene glycol, propylene glycol, butane-1,2-diol, cyclohexane-1,2-diol and cyclopentane-1,2-diol can be used, and that as the 1,3-glycols, aliphatic and cycloaliphatic dihydric alcohols such as trimethylene glycol, neopentylene glycol, butane-1,3-diol and cyclohexane-1,3-diol may be used.

It is further known that 1,2-glycol esters or 1,3-glycol esters of aliphatic or aromatic hydroxy acids, for example, β-hydroxyethyl- or γ-hydroxypropyl-p-β-hydroxyethoxybenzoate or p-β-hydroxyethoxyvanillate, can form polyesters by self-condensation, and some of such polyesters also serve as the material for useful fiber and film.

Briefly stating the characteristics of this invention, the subject process comprises a polyester-forming reaction releasing 1,2-glycols or 1,3-glycols such as above-specified, wherein, after the intrinsic viscosity of the reaction product being formed in the condensation polymerization step has reached 0.2 or above, a carbonate derivative of a monovalent phenol is added to the molten polyester reaction product and after such addition, the condensation polymerization reaction releasing 1,2-glycols or 1,3-glycols is completed by further heating the reaction mixture under a reduced pressure to maintain its molten state. The 1,2- or 1,3-glycols thus released during the reaction are taken off from the system as the reaction is performed at subatmospheric pressure.

Generally, the preparation of polyesters of organic acids may be considered as composed of two steps. The first is the step of preparing intermediates of relatively low molecular weights, by reaction of a dibasic acid or its functional derivative with a dihydric alcohol or its functional derivative, for example, an alkylene carbonate, in the presence of a known catalyst, or by self-condensation of a hydroxycarboxylic acid or its functional derivative, e.g. an aliphatic glycol ester of hydroxycarboxylic acid, in the presence of a known catalyst. The second step is the condensation polymerization step for the preparation of a high molecular weight polymer by further heating the product of the first step at a reduced pressure.

For example, the polyester-forming reaction from a dibasic acid of the following formula

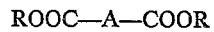

wherein R stands for hydrogen or a lower aliphatic hydrocarbon group or its lower aliphatic ester with a 1,2- or 1,3-glycol of the formula

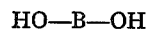

can be divided into two steps; i.e., the first step of forming an ester of the formula

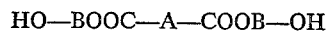

or its low condensation product, and the second step of condensation polymerization of the said ester or its low condensation product by heating the reaction mixture at a reduced pressure to maintain its molten state and remove therefrom 1,2- or 1,3-glycol of the formula

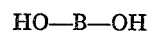

Of course, the said two steps can be carried out continuously in a same reaction vessel.

According to the present invention, during the condensation polymerization step of the polyester-forming reaction releasing a 1,2- or 1,3-glycol under heating at subatmospheric pressure, after the condensation polymerization reaction has advanced until the intrinsic viscosity of the reaction product measured as later specified has reached 0.2 or above, a carbonate derivative of a monovalent phenol is added to the reaction product as the sole additive, and thereafter the reaction mixture is further heated at a reduced pressure so that it may maintain its molten state, and its condensation polymerization reaction is further advanced.

The "intrinsic viscosity" used herein is calculated from the value measured at 35° C. in orthochlorophenol solvent.

According to this invention, polyesters having an intrinsic viscosity higher than 0.2 can also be obtained as follows.

From a 1,2- or 1,3-glycol ester of a dibasic acid or a hydroxy acid or its low condensate, a polyester having an intrinsic viscosity of at least 0.2 is prepared in advance. Then the same polyester is heated and melted, and to the melt a carbonate derivative of a monovalent phenol is added. The reaction mixture is further heated at a reduced pressure to perform the condensation polymerization reaction releasing the 1,2- or 1,3-glycol. Thus in accordance with this invention, polyesters of higher degree of polymerization can be produced.

In the past, for the purpose of accelerating the rate of the said condensation polymerization step for forming the polyester, many catalysts, for example, antimony compounds such as potassium antimonate, antimony trioxide, antimony pentoxide and antimony trichloride; germanium compounds such as germanium trioxide; titanium compounds such as titanium alkoxide and alkali metal salts of titanic acid; organic acid salts such as acetates and benzoates of manganese, lead and zinc; and inorganic acid salts such as carbonates and borates of such metals, have been proposed.

However, even when these catalysts are used, still a considerably long time is required for the production of highly polymerized polyester, and as the reaction is normally carried out at such high temperatures as 200°–350° C., undesirable side reaction such as thermal decomposition cannot be avoided. For example, in commercial scale production of polyethylene terephthalate for useful fibers, it is necessary that the reaction should be continued for 2–10 hours at high temperatures ranging from 270°–290° C. and high degree of vacuum such as 0.1 mm. Hg. Therefore, for securing a regular output, enormous size equipment is required and exposure of the reaction mixture to such high temperatures for that long period inevitably results in such undesirable effect as coloration of the product polymer.

In accordance with the present invention the rate of the condensation polymerization reaction can be remarkably accelerated by carrying out the further condensation polymerization of the reaction product (polyester) having an intrinsic viscosity of at least 0.2 in the presence of, in addition to the aforesaid known catalyst or catalysts, a carbonate derivative of a monovalent phenol.

The "substantially linear polyesters" in this invention may be any type of polyester as long as it is obtained by removing 1,2- or 1,3-glycol at the time of its polymerization. These polyesters of course include copolyesters composed of two or more of the acid components and/or two or more of the glycol component. In practicing this invention, a minor amount of a monofunctional ester-forming compound as a chain-terminator and/or minor amount of a polyfunctional compound, which is at least tri-functional, as a chain-branching agent may be added. Therefore "substantially linear polyesters" include all of such products. Again as already stated, they may be such polyesters as polyethylene terephthalate in which a glycol is one of the polyester-constituting components, or they may be self-condensation polyesters which are obtained by removing glycols from glycol esters of hydroxycarboxylic acids in which the released glycols are not the constituent of the polyesters.

The "carbonate derivative of monovalent phenol" used in this invention may be one or more of the compounds represented by the formulae:

    (1)

    (2)

wherein Y and Z are selected from the group consisting of lower alkyl group having from 1 to 6 carbon atoms, naphthyl, cyclohexyl, phenyl, and substituted phenyl groups wherein the substitution is selected from lower alkyl groups containing from 1 to 6 carbon atoms, cyclohexyl and phenyl groups and halogen atoms. X is selected from the group consisting of a halogen atom, e.g. chlorine, bromine, iodine etc., and a thio-organic radical of the formulae Y—S, wherein Y is as defined above. In Formula 1, Y and Z may be the same or different groups and Y may further contain one or more carbonate residues of a monovalent phenol of the formula

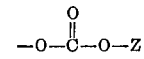

or

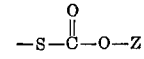

and at least Y or Z being a phenyl, naphthyl or substituted phenyl radical.

Among such derivatives, those particularly preferred for achieving the objects of this invention include, for example:

(1) Compounds belonging to the above Formula 1 diphenyl carbonate

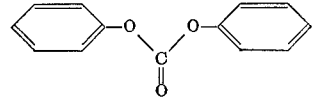

di-o-tolyl carbonate

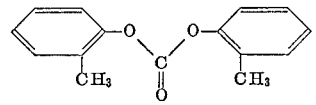

di-ethylphenyl carbonate

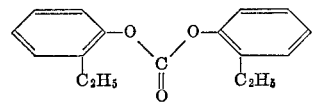

propylphenyl phenyl carbonate

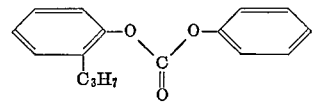

di-butylphenyl carbonate

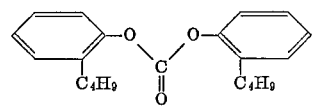

p-chlorphenyl phenyl carbonate

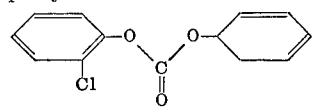

di-o-chlorophenyl carbonate

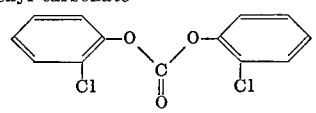

di-p-propylphenyl carbonate

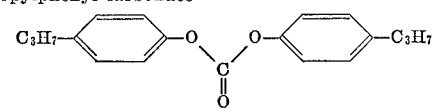

di-(o,p-diethylphenyl) carbonate

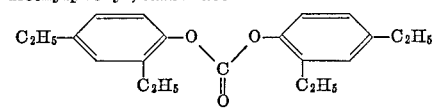

di-o-pentylphenyl carbonate

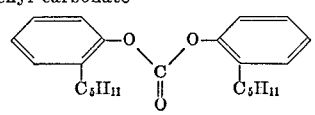

di-p-cyclohexylphenyl carbonate
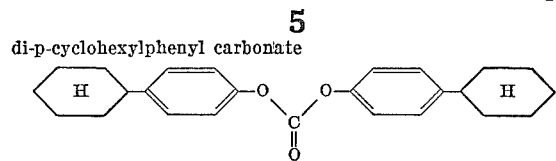

o-ethylphenyl-o-chlorophenyl carbonate
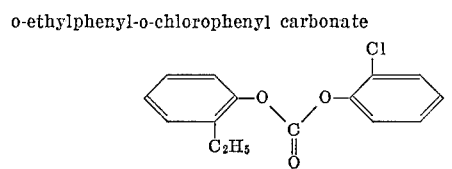

di-p-chlorophenyl carbonate
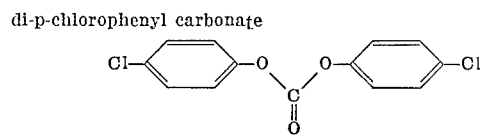

di-β-naphthyl carbonate
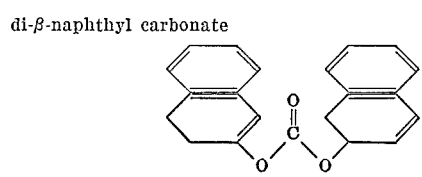

di-o-phenylphenyl carbonate
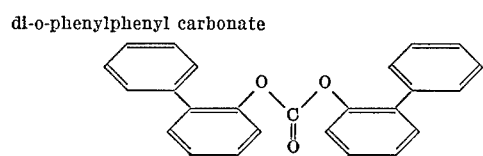

di-(2,6-dimethylphenyl) carbonate
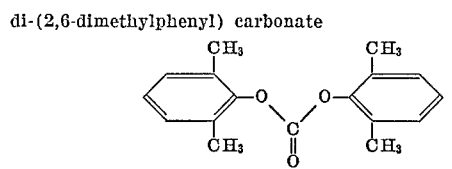

phenyl cyclohexyl carbonate
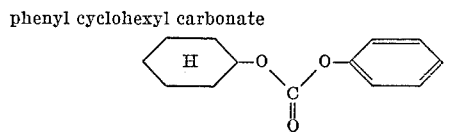

phenyl β-naphthyl carbonate
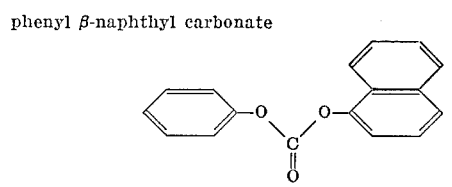

p-phenylphenyl ethyl carbonate
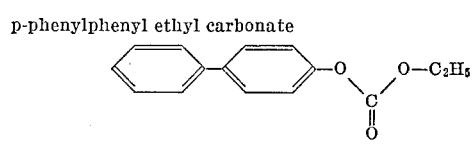

phenyl propyl carbonate
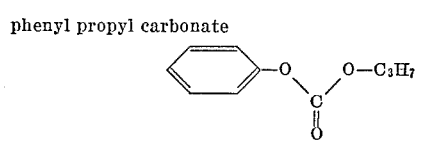

o-chlorophenyl pentyl carbonate
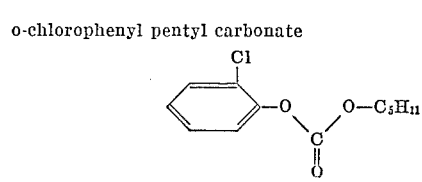

β-naphthyl butyl carbonate
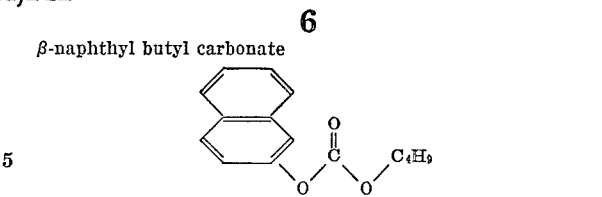

reaction product of isopropylidenediphenyl and phenyl chlorocarbonate
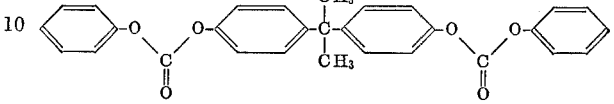

compound of the formula
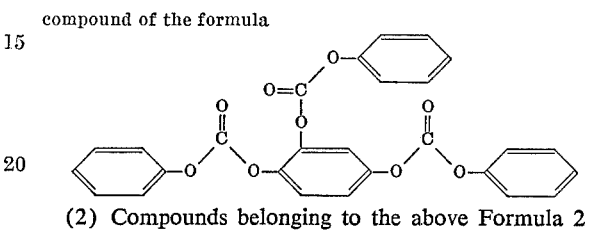

(2) Compounds belonging to the above Formula 2 phenyl chlorocarbonate
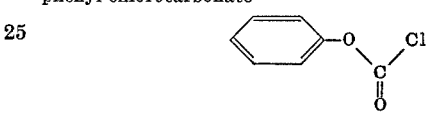

p-phenylphenyl chlorocarbonate
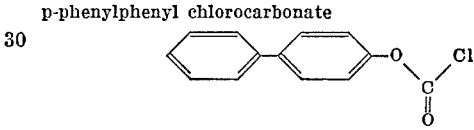

p-ethylphenyl chlorocarbonate
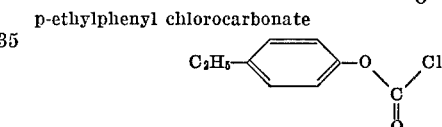

β-naphthyl chlorocarbonate
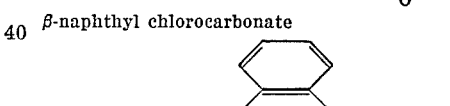

diphenyl monothiocarbonate

di-β-naphthyl monothiocarbonate
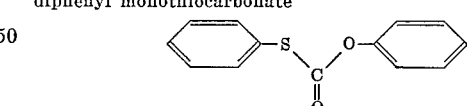

di-o-propylphenyl monothiocarbonate
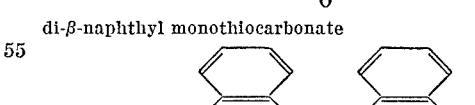

p-phenylphenyl monothiocarbonate
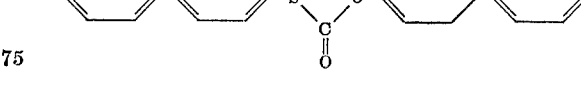

When the carbonate derivative of a monovalent phenol is added to the polyester-forming condensation polymerization system at the specified stage, it is observed that at least a portion thereof decomposes and forms a monovalent phenol of the formula HO—Z. However, if the monovalent phenol remains in the reaction system for a long time, it may function as a chain terminator of the product polyester and thereby adversely affect the molecular weight increase of the polyester. Therefore it is preferred to select the atomic group Z in the above Formulae 1 and 2 so that the decomposition product HO—Z thereof may be distilled from the reaction system by evaporation under the polyester-forming reaction conditions after the addition of the derivative.

It has been empirically confirmed through many experimental data that the addition of the derivative during the condensation polymerization step of the polyester-forming reaction is under progress, viz., after the intrinsic viscosity of the reaction product (polyester of low degree of condensation) has reached 0.2 or above, is much more effective for increasing the condensation polymerization speed than the addition thereof before the specified stage.

Therefore, as is also the case of re-melting a once formed low polyester and forming a polyester of a higher degree of polymerization therefrom in accordance with this invention, the starting polyester should have an intrinsic viscosity of at least 0.2. When this invention is applied to polyesters having an intrinsic viscosity of 0.6 or above, polyesters of very high molecular weights, not obtainable in the past in molten state, for example, that having an intrinsic viscosity of about 1.4, can be obtained within a very short reaction period. Again according to this invention, such high molecular weight polyesters can be obtained not only by such re-melting method but also by adding a carbonate derivative of a monovalent phenol to the conventional condensation polymerization reaction system, at the relatively advanced stage, viz., when the intrinsic viscosity of the reaction product reaches preferably 0.6 or above.

In conventional methods, addition of suitable catalysts at the condensation polymerization step is practiced, but the rate of the reaction in such methods is invariably very much less than that obtained in this invention in which a carbonate derivative of a monovalent phenol is added. Therefore in those methods, when the molecular weight of the product polyester reaches a certain level, a depolymerization reaction is promoted to make the production of polyesters having an intrinsic viscosity of above 1 very difficult. Again according to the conventional practice, it is possible to form a high polyester having an intrinsic viscosity of about 1.05 by the use of a special catalyst, such as a titanium compound. However, that method is always subject to such a deficiency that the product polyester is remarkably colored due to undesirable side reactions.

In contrast, according to this invention, by the addition of the said carbonate derivative at the suitable stage of the condensation polymerization reaction using a conventional catalyst, the reaction rate is remarkably accelerated, and the condensation polymerization reaction period is remarkably shortened. As the result, the depolymerization reaction is inhibited, and uncolored polyesters of very high degree of polymerization, as could not be obtained before, can be produced.

Therefore very highly polymerized polymers can be obtained by using the reaction product of this invention as the starting material and further adding to the reaction system a carbonate derivative in accordance with this invention. This can be performed either continuously to the first polyester-forming reaction, or independently by re-melting the first reaction product.

Generally the amount of the said carbonate derivative to be added should be large when the reaction product (polyester) at the time of the addition has a low degree of polymerization, while a small amount is sufficient to quickly raise the degree of polymerization when the reaction product has a high degree of polymerization. It has been found that the said carbonate derivative is preferably added in such an amount that it be no more than the mol percent $y$ calculated from the following equation to the total mol number of the acid component constituting the polyester $$y = -2x^3 + 9x^2 - 17x + 13.5$$

In the equation, $x$ is a positive number of from 0.2–1.5 and represents the intrinsic viscosity of the reaction product (polyester) in the system at the time the said carbonate derivative is added, and $y$ represents the upper limit in mol percent of the amount of the derivative to be added to the total mol number of the acid component constituting the polyester.

Thus it is preferred in this invention to determine the upper limit of the amount added of the said carbonate derivative in accordance with the degree of polymerization or intrinsic viscosity of the reaction product (polyester) at the time the derivative is added. This is because certain of the said derivatives do not show better results when added in an amount exceeding the upper limit, and some may even lower the rate of condensation polymerization reaction when added in excess.

As stated previously, progressively less amount of the carbonate derivative is sufficient to achieve the remarkable result as the degree of polymerization of the reaction product (polyester) before the time of the addition becomes greater. For example, in case of producing polyethylene terphthalate, when 1 mol percent of the carbonate derivative is added to the terephthalic acid component of the polyester, the polymerization time required to raise the average molecular weight of the product from 15,000 to 30,000 is about $\frac{1}{30}$ of that of the case without the addition. Furthermore, according to this invention polyethylene terephthalate having a molecular weight of 40,000 or above can be readily prepared, while production of such high molecular weight polyethylene terephthalate has been heretofore very difficult in melt polymerization.

Again, production of a high molecular weight polyester by 1,2- or 1,3-glycol-releasing reaction is often performed under a high degree of vacuum such as 1 mm. Hg or even higher. When the carbonate derivative is added in accordance with this invention, the reaction progresses under a low degree of vacuum such as 20–100 mm. Hg. This is another notable advantage of this invention.

In this invention, the total amount of the carbonate derivative may be added at once, portionwise, or continuously.

Again, to the polyesters obtained in accordance with this process, a delusterant such as titanium oxide, and stabilizers such as phosphorus acid may be added in accordance with the accepted practices of the art.

According to this invention, the time required for condensation polymerization of the polyester is remarkably shortened compared with the conventional methods, and, furthermore, the product polyesters have excellent color tone and softening points of the same level as that of the conventional products.

The said carbonate derivatives used in the process of this invention do not substantially change the molecular structure of the polyester, but only serve to accelerate the rate of polymerization. We found that the polyesters obtained in accordance with this invention have rather decreased amount of terminal carboxyl groups compared with the polyesters obtained from conventional methods. This again is another advantage of this invention. Further, the advantages of this invention are notable when the process is practiced with commercial scale apparatus, particularly in the continuous polymerization or continuous polymerization and spinning of highly polymerized polyethylene terephthalate.

The following examples of this invention are given for illustration purposes only, it being understood that the present invention is in no way to be deemed as limited thereto.

In the following, parts are by weight.

Example 1

A reactor with a rectification column was charged with 97 parts of dimethyl terephthalate, 69 parts of ethylene glycol, 0.04 part of antimony trioxide and 0.088 part of calcuim acetate, and the content was heated while distilling off the methanol formed. After the methanol distillation was completed, excessive glycol started to be distilled off, which also was removed from the reaction system. When the inside temperature of the reactor reached 230° C., the reaction product (precondensate) was transferred into another reactor, in which the reaction was continued at the temperature gradually raised to 260° C. during about 30 minutes and at the reduced pressure of 20 mm. Hg.

Then the temperature inside the reactor was quickly raised to 275° C., and the reaction was further performed at the high vacuum of 0.1 mm. Hg–1 mm. Hg. Within about 20 minutes of the high vacuum reaction, the intrinsic viscosity of the product polymer rose to 0.21. Then 1.8 parts of diphenyl carbonate were added to the system, followed by about 1 minute's stirring at the atmospheric pressure. The high vacuum reaction then was immediately continued. After about 3 minutes, the intrinsic viscosity of the polymer rose to 0.60. The resultant polymer was a colorless solid having a softening point of 258.4° C.

Examples 2–7

Reactors with rectification columns were charged each with 97 parts of dimethyl terephthalate and 69 parts of ethylene glycol, and each with the catalyst specified in col. 2 of Table 1 below in the amount specified in col. 3 of the same table.

When the temperature of the reactors reached 150° C. methanol started to be distilled off, which stopped as the temperature rose gradually to 230° C. Then the reaction mixtures were transferred into other reactors which were then immersed in a salt bath of 275° C. and from which excessive ethylene glycol was distilled off for 30 minutes at the atmospheric pressure. After additional 30 minutes' reaction at the vacuum of 20 mm. Hg, the reaction mixtures were subjected to high vacuum reaction at 0.2–0.3 mm. Hg for the period each indicated in col. 4 of Table 1. In col. 5 of the same table, intrinsic viscosities and softening points of the reaction products sampled each at the reaction time indicated in col. 4 are given.

TABLE 1.—POLYMERIZATION WITHOUT ADDITION OF CARBONATE DERIVATIVES

| Control No. | Catalyst | Amount of Catalyst (part) | High Vacuum Reaction Time (min.) | Intrinsic Viscosity | Softening Point (° C.) |
|---|---|---|---|---|---|
| 1 | $Ca(OAc)_2 \cdot 2H_2O$ | 0.08 | 30 | 0.35 | 262.3 |
|   | $Sb_2O_3$ | 0.04 | 60 | 0.59 | 261.9 |
|   |   |   | 90 | 0.75 | 260.7 |
|   |   |   | 120 | 0.85 | 259.7 |
| 2 | $Zn(OAc)_2 \cdot 2H_2O$ | 0.03 | 30 | 0.44 | 260.1 |
|   | $Sb_2O_3$ | 0.04 | 60 | 0.72 | 257.8 |
|   |   |   | 90 | 0.88 | 256.9 |
|   |   |   | 120 | 0.95 | 256.7 |
| 3 | $Ti(OC_2H_5)_4$ | 0.01 | 30 | 0.57 | 258.2 |
|   |   |   | 60 | 0.85 | 256.5 |
|   |   |   | 90 | 1.00 | 253.3 |
| 4 | $Mn(OAc)_2 \cdot 2H_2O$ | 0.05 | 40 | 0.38 | 261.8 |
|   |   |   | 60 | 0.61 | 260.1 |
|   |   |   | 90 | 0.62 | 260.1 |
| 5 | $Zn(OAc)_2 \cdot 2H_2O$ | 0.05 | 60 | 0.61 | 256.8 |
|   |   |   | 90 | 0.78 | 253.7 |

Table 2 shows the change in degrees of polymerization which resulted from addition of 1.2 parts of diphenyl carbonate during the reaction as above described. That is, the intrinsic viscosities of the reaction products at the time as indicated in col. 4 of Table 2 after the initiation of the high vacuum reaction were measured, which are given in col. 5. Then to each reaction system 1.2 parts of diphenyl carbonate were added, mixed for 1 minute, and the reaction was continued for 2 further minutes at the vacuum of 20 mm. Hg, during which a remarkable rise in melt viscosity with foaming was observed. The foaming substantially terminated during the subsequent 10 minutes' high vacuum reaction. The intrinsic viscosities and softening points of the reaction products sampled at that time are shown in col. 6.

TABLE 2

| Example No. | Catalyst | Amount of Catalyst (part) | High Vacuum Reaction Time (min.) | Intrinsic Viscosity of Polymer Immediately Before Addition of Diphenyl Carbonate | Polymer after Addition of Diphenyl Carbonate and Subsequent Reaction | |
|---|---|---|---|---|---|---|
|   |   |   |   |   | Intrinsic Viscosity | Softening Point (° C.) |
| 2 | $Ca(OAc)_2 \cdot 2H_2O$ | 0.08 | 60 | 0.59 | 1.15 | 258. |
|   | $Sb_2O_3$ | 0.04 |   |   |   |   |
| 3 | $Zn(OAc)_2 \cdot 2H_2O$ | 0.03 | 35 | 0.60 | 1.00 | 259.0 |
|   | $Sb_2O_3$ | 0.04 |   |   |   |   |
| 4 | $Te(OC_2H_5)_4$ | 0.01 | 40 | 0.69 | 1.34 | 257.9 |
| 5 | $Mn(OAc)_2 \cdot 2H_2O$ | 0.05 | 60 | 0.54 | 0.90 | 260.6 |
| 6 | $Zn(OAc)_2 \cdot 2H_2O$ | 0.05 | 60 | 0.61 | 0.89 | 260.9 |
| 7 | $Ca(OAc)_2 \cdot 2H_2O$ | 0.08 | 90 | 0.75 | 1.10 | 259.5 |
|   | $Sb_2O_3$ | 0.04 |   |   |   |   |
| Control 6* | $Ca(OAc)_2 \cdot 2H_2O$ | 0.08 | 0 | 0.13 | 0.17 |   |
|   | $Sb_2O_3$ | 0.04 |   |   |   |   |

*In Control 6, diphenyl carbonate was added to the reaction product of low degree of polymerization.

By comparing the results of Control 1 of Table 1 with Example 2 of Table 2; Control 2 with Example 3; Control 3 with Example 4; and Control 4 with Example 5, the advantages of adding the carbonate derivative as in this invention can be understood.

Control 7.—The reaction of Example 2 as in the first experiment in Table 2 was repeated except that 10 parts of diphenyl carbonate were added in place of 1.2 parts. The intrinsic viscosity of the resultant reaction product was 0.57, and a large amount of unreacted diphenyl carbonate was distilled off the reaction system. Thus no raise in the polymerization degree was observed.

With this control experiment, it can be understood that the carbonate derivative should not be used in large excess.

Example 8

An autoclave with a distillation column was charged with 120 parts of terephthalic acid, 80 parts of ethylene glycol and 0.065 part of basic zinc carbonate, and heated to 240° C. at a pressure of 2.4 kg./cm.$^2$ The reaction was completed after 90 minutes during which the water as formed was distilled off the system through the distillation column. After addition to the system of 0.043 part of antimony trioxide, the reactor was put in a bath of 275° C., and the excess ethylene glycol was distilled off for 30 minutes. After subsequent 30 minutes' reaction at 20 mm. Hg, the reaction was continued for 60 minutes further at the high vacuum of 0.1 mm. Hg. The resultant polymer had an intrinsic viscosity of 0.60, and a terminal carboxyl group content of 8 eq./$10^6$ g.

Then to the molten reaction product, 0.75 part of diphenyl carbonate were added at atmospheric pressure and mixed for 1 minute, immediately followed by 2 minutes of high vacuum reaction. The resultant polymer had an intrinsic viscosity of 0.91, a terminal carboxyl group content of 6.1 eq./$10^6$ g., and a softening point of 260.3° C.

Example 9

A reactor with a rectification column was charged with 97 parts of dimethyl terephthalate, 69 parts of ethylene glycol, 0.08 part of calcium acetate and 0.04 part of antimony trioxide, heated, and the methanol formed was distilled off the system. Then the reaction product was transferred into another reactor, immersed in a salt bath of 280° C. and reacted for 30 minutes at atmospheric pressure during which the excess ethylene glycol was distilled off. The reaction was further continued for 30 minutes at 20 mm. Hg, and for additional 30 minutes at the high vacuum of 0.2–0.3 mm. Hg. The reaction product had an intrinsic viscosity of 0.40, and 0.6 part of diphenyl carbonate were added with mixing for 1 minute at atmospheric pressure. After the subsequent reaction for 2 minutes at 20–30 mm. Hg and for 5 minutes at 0.1–0.2 mm. Hg, the intrinsic viscosity of the reaction product rose to 0.70. Then an additional 0.6 part of diphenyl carbonate were added to the same molten polymer with mixing for 1 minute at atmospheric pressure, and the system was reacted at 20 mm. Hg and for a further 5 minutes at 0.2–0.3 mm. Hg. The resultant reaction product had an intrinsic viscosity of 1.05. When still 0.4 more part of diphenyl carbonate were added to the same product followed by the similar mixing under atmospheric pressure and reaction at reduced pressures, the final product came to have an intrinsic viscosity of 1.20.

Example 10

By the similar method as shown in Example 1, a polymer having an intrinsic viscosity of 0.60 was prepared without the addition of diphenyl carbonate but with the prolonged high vacuum reaction time of 60 minutes. In succession, 1.1 parts of diphenyl carbonate were added to the molten reaction product (polymer), and the system was reacted for about 100 seconds at the vacuum of about 20 mm. Hg. The resultant polymer had a melting point of 257.8° C. and an intrinsic viscosity of 0.90.

Example 11

A reactor with a rectification column was charged with 97 parts of dimethyl terephthalate, 69 parts of ethylene glycol, 0.08 part of calcium acetate, and 0.04 part of antimony trioxide and heated until the ester-interchange reaction was completed, while distilling off the methanol formed. Then the reaction product was transferred into another reactor and immersed in a salt bath of 290° C. so that the excessive ethylene glycol may be distilled off. After about 30 minutes when the ethylene glycol distillation substantially ceased, the reaction was continued for a further 20 minutes at 20 mm. Hg. During the subsequent 5 minutes the temperature of the salt bath was raised to 300° C., and the degree of vacuum was raised to 0.3–0.5 mm. Hg under which conditions the reaction being continued. After about 30 minutes, the reaction product had an intrinsic viscosity of 0.67 and a terminal carboxyl group content of 13.3 eq./$10^6$ g. When 1.2 parts of a diphenyl carbonate were added to the same reaction product followed by 2 minutes' mixing at 20 mm. Hg and 2 minutes' reaction at 0.5–0.6 mm. Hg, a colorless reaction product having an intrinsic viscosity of 1.11 and a terminal carboxyl group content of 10.2 eq./$10^6$ g. was obtained. For comparison, the similar experiment was carried out at 300° C. and at the high degree of vacuum as 0.3–0.5 mm. Hg without the addition of diphenyl carbonate, other conditions being the same to the above, with the result that after 50 minutes at the high vacuum, the reaction product came to have an intrinsic viscosity of 0.85 and a terminal carboxyl group content of 27 eq./$10^6$ g. after 70 minutes, however, the product colored yellowish brown due to thermal decomposition and had an intrinsic viscosity of 0.80 and a terminal carboxyl group content of 46 eq./$10^6$ g. Further, after 120 minutes, its intrinsic viscosity was lowered to 0.73. Thus a highly polymerized reaction product could not be obtained.

Examples 12–17

Reactors each with a rectification column were each charged with 97 parts of dimethyl terephthalate, 69 parts of ethylene glycol, 0.08 part of calcium acetate and 0.04 part of antimony trioxide, and heated. When the inside temperature of the reactors reached 150° C., methanol started to be distilled off, which stopped when the temperature reached 230° C. after the gradual rise as the reaction advance. Then the contents of the reactors were transferred into other reactors, immersed in a salt bath of 275° C., followed by distillation off of the excessive ethylene glycol for 30 minutes at atmospheric pressure. The reaction was continued for 30 minutes at 20 mm. Hg and further 60 minutes at the high vacuum of 0.2–0.3 mm. Hg. The intrinsic viscosities of the reaction product polymers at that stage are indicated in col. 4 of Table 3 below. To each of the products the compound shown in col. 2 of the table was added in an amount specified in col. 3, mixed for 2 minutes at atmospheric pressure by stirring, and then the reaction was continued for 2 minutes at 20 mm. Hg and for 15 minutes at 0.2–0.3 mm. Hg. The intrinsic viscosities and softening points of the resultant reaction products are shown in cols. 5 and 6 of Table 3, in respective order. For comparison, results of control examples in which an aliphatic carbonate and a cycloaliphatic carbonate were added are also shown.

TABLE 3

| Example No. | Carbonate | Addition Amount (part) | Intrinsic Viscosity of Polymer Immediately Before Addition of Carbonate ($\eta$) | Intrinsic Viscosity of Product Polymer ($\eta$) | Softening Point of Product Polymer (° C.) |
|---|---|---|---|---|---|
| 12 | Di-β-naphthyl carbonate | 1.7 | 0.60 | 1.00 | 259.9 |
| 13 | Di-o-phenylphenyl carbonate | 1.9 | 0.60 | 1.30 | 257.1 |
| 14 | Di-o-tolyl carbonate | 1.4 | 0.62 | 1.07 | 259.5 |
| 15 | Di-2,6-dimethylphenyl carbonate | 1.5 | 0.60 | 0.85 | 260.8 |
| 16 | p-Phenylphenyl chlorocarbonate | 1.3 | 0.62 | 0.87 | 259.2 |
| 17 | p-Phenylene phenyl o-tolyl dicarbonate | 1.9 | 0.60 | 0.95 | 258.0 |
| Control 8 | Dicyclohexyl carbonate | 1.2 | 0.58 | 0.69 | 261.6 |
| Control 9 | Dilauryl carbonate $\left(C_{12}H_{25}O\right)_{2}C=O$ | 1.9 | 0.62 | 0.65 | 261.3 |

Example 18

A reactor with a rectification column was charged with 116 parts of dimethyl sebacate, 84 parts of trimethylene glycol, 0.057 part of zinc acetate and 0.04 part of antimony trioxide, and heated while the methanol formed was distilled off. The reaction product was tarnsferred into another reactor, heated in a bath of 270° C. for 1 hour at atmospheric pressure, and further reacted for 30 minutes at the bath temperature of 275° C. at 20 mm. Hg so that the excess trimethylene glycol should be removed. After the subsequent high vacuum reaction at 0.1 mm. Hg for 30 minutes at the bath temperature of 275° C., a polymer having an intrinsic viscosity of 0.25 was obtained. When to the molten polymer at the bath temperature of 275° C. 0.75 part of phenyl lauryl carbonate were added and mixed followed by 3 minutes of high vacuum reaction. The intrinsic viscosity of the polymer rose to 0.41.

Examples 19 and 20

Reactors each with a rectification column were charged each with a dibasic ester as specified in col. 2 of Table 4, and a glycol of col. 4 in the respectively specified amounts in columns 3 and 5, 0.08 part of calcium acetate and 0.04 part of antimony trioxide. The reactors were heated and as their inside temperature reached 150° C., methanol started to distill off, which ended when the temperature reached 230° C. Then the reaction contents were transferred into other reactors, immersed in a salt bath of 275° C., and reacted for 30 minutes at atmospheric pressure, for 30 minutes at 20 mm. Hg, and further for the time specified in col. 6 of Table 4 at the high degree of vacuum. The intrinsic viscosities and melting points of the reaction products are given in columns 9 and 8 of Table 4.

2.4 parts of diphenyl carbonate were added after the specified duration of the high vacuum reaction in col.

6 of Table 5 to the reaction products having the intrinsic viscosities specified in col. 7 and mixed with the respective reaction product by stirring for 1 minute at atmospheric pressure, followed by reaction of 2 minutes at 20 mm. Hg and 10 minutes at 0.2–0.3 mm. Hg. The intrinsic viscosities of the resultant polymers are given in col. 7.

Example 22

A reactor with a rectification column was charged with 97 parts of dimethyl terephthalate, 69 parts of ethylene glycol, 11 parts of methoxypolyethylene glycol having an average molecular weight of 1500, $$CH_3O(CH_2CH_2O)_nH (n=33-34)$$

TABLE 4.—POLYMERIZATION WITHOUT ADDITION OF CARBONATE DERIVATIVES

| Control No. | Dibasic Ester (1) | Amount of (1) (part) | Glycol (2) | Amount of (2) (part) | High Vacuum Reaction Time (min.) | Intrinsic Viscosity ($\eta$) | Melting Point (° C.) |
|---|---|---|---|---|---|---|---|
| 10 | Dimethyl sebacate | 115 | Ethylene glycol | 69 | 20 | 0.50 | |
| | | | | | 40 | 0.82 | |
| | | | | | 60 | 1.02 | 83.5 |
| 11 | Dimethyl isophthalate | 97 | Ethylene glycol | 75 | 30 | 0.20 | |
| | | | | | 70 | 0.40 | |
| | | | | | 120 | 0.62 | 241.0 |

TABLE 5

| Example No. | Dibasic Ester (1) | Amount of (1) (part) | Glycol (2) | Amount of (2) (part) | High Vacuum Reaction Time (3) (min.) | Intrinsic Viscosity of Polymer Immediately after (3) ($\eta$) | Intrinsic Viscosity of High Vacuum Product Polymer after Addition of diphenyl Carbonate ($\eta$) |
|---|---|---|---|---|---|---|---|
| 19 | Dimethyl sebacate | 15 | Ethylene glycol | 69 | 20 | 0.50 | 1.18 |
| 20 | Dimethyl isophthalate | 97 | Ethylene glycol | 75 | 70 | 0.39 | 1.00 |

Control 12.—A reactor with a rectification column was charged with 97 parts of dimethyl terephthalate, 100 parts of cyclohexane-1,4-dimethanol and .026 part of 20% isopropyl alcohol solution of titanium isopropoxide, and heated. When the inside temperature of the reactor reached 170° C., methanol started to distill off, which stopped when the temperature reached 245° C. Then the reaction product was transferred into another reactor which was immersed in a salt bath of 300° C., and the content was reacted for 30 minutes at atmospheric pressure, 30 minutes at 20 mm. Hg, and 80 minutes at the high vacuum of 0.2–0.3 mm. Hg. The resultant reaction product had a softening point of 293° C. and an intrinsic viscosity fo 0.77.

The similar experiment was repeated except that the high vacuum reaction was stopped after 60 minutes from the time it started, and a part of the product was taken as the sample. Then to the remaining product 1.2 parts of diphenyl carbonate were mixed in with 1 minute's stirring at atmospheric pressure, and the reaction was continued for 2 minutes at 20 mm. Hg, and for further 15 minutes at 0.1–0.2 mm. Hg. The intrinsic viscosity of the sample taken after 60 minutes of the high vacuum reaction was 0.60, whereas that of the product was 0.69 after the addition of diphenyl carbonate and the subsequent reaction.

Example 21

A reactor was charged with 113 parts of well dried β-hydroxyethyl-p-β-hydroxyethoxybenzoate and 0.05 part of 20% titanium tetraethoxide solution in ethyl alcohol. The same reactor was put in a salt bath of 240° C., and the content was reacted by heating while nitrogen gas was passed therethrough with stirring. Then the salt bath temperature was raised to 260° C., and the reaction was continued at the vacuum of 0.1–0.2 mm. Hg for 300 minutes. The sample reaction product taken at that time had an intrinsic viscosity of 0.57 and a softening point of 213° C.

The above reaction was repeated except that the high vacuum reaction time was shortened to 280 minutes, and to the reaction system 1.2 parts of diphenyl carbonate were added. Subsequently the reaction was continued for 2 minutes at 20 mm. Hg, and for additional 17 minutes at the high vacuum of 0.1–0.2 mm. Hg. The resultant reaction product had an intrinsic viscosity of 0.70 and a softening point of 213° C.

0.08 part of calcium acetate and 0.04 part of antimony trioxide, an an ester-interchange reaction was carried out in the similar manner as in Example 2. The reaction product was transferred into another reactor which was subsequently immersed in a salt bath of 275° C. The content was reacted for 30 minutes at atmospheric pressure and the excessive ethylene glycol was distilled off. The reaction was further continued for 30 minutes at 20 mm. Hg. and additional 60 minutes at 0.1–0.2 mm. Hg. The reaction product sampled at that time had an intrinsic viscosity of 0.39. To the same product, 1.2 parts of diphenyl carbonate were added, and the reaction was continued for 3 minutes at atmospheric pressure, 3 minutes at 20 mm. Hg, and finally 15 minutes at 0.1–0.2 mm. Hg. The obtained reaction product had an intrinsic viscosity of 0.58 and a softening point of 259.7° C.

For comparison, the above experiment was repeated except that the addition of diphenyl carbonate was omitted but the high vacuum reaction time was prolonged to 90 minutes. The resulting polyester had an intrinsic viscosity of 0.47 and a softening point of 259.6° C.

Example 23

A reactor with a rectification column was charged with 88 parts of dimethyl terephthalate, 9 parts of dimethyl isophthalate, 69 parts of ethylene glycol, 0.08 part of calcium acetate and 0.04 part of antimony trioxide, and heated. When the inside temperature of the reactor reached 150° C., the methanol formed started to distill off, and as the heating was continued and the temperature reached 240° C., the methanol distillation stopped. Then the reaction product was transferred into another reactor which subsequently was put in a salt bath of 280° C. The reaction was thus continued for 30 minutes at atmospheric pressure, for 30 minutes at 20 mm. Hg, and for additional 70 minutes at the high vacuum of 0.2–0.3 mm. Hg. The reaction product sampled at this time had an intrinsic viscosity of 0.51. Then, 1.3 parts of di-o-tolyl carbonate were added to the reaction system and mixed with stirring. The system was left at atmospheric pressure for 10 minutes, and further reacted for 3 minutes at 20 mm. Hg and 20 minutes at the high vacuum of 0.1 mm. Hg. The resultant reaction product was a polyester having an intrinsic viscosity of 1.06 and a softening point of 240.0° C.

For comparison, the above experiment was repeated except that the addition of di-o-tolyl carbonate was omitted but the high vacuum reaction was continued for 100 minutes. The resultant reaction product was a polyester having an intrinsic viscosity of 0.80 and a softening point of 240.1° C.

Example 24

The polymer having an intrinsic viscosity of 0.85 which was prepared as in Control 1 was cooled, solidified and pulverized into particles of size 100 mesh. The polymer powder was dried for 3 hours in nitrogen gas current heated to 160° C., and then melted in a reactor immersed in a salt bath of 280° C. under the nitrogen gas current. The molten polymer had an intrinsic viscosity of 0.79. To the melt, 1.9 parts of diphenyl carbonate were added and mixed with stirring for 1 minute at atmospheric pressure, followed by 2 minutes' reaction at 200 mm. Hg and additional 5 minutes' reaction at the high vacuum of 0.01–0.2 mm. Hg. The resultant polymer had an intrinsic viscosity of 0.99 and a softening point of 260.1° C.

under atmospheric pressure for 30 minutes. Further, the contents were reacted under a reduced pressure of 20 mm. Hg for 30 minutes, thereafter reacted under a highly reduced pressure of 0.2–0.3 mm. Hg for 60 minutes. The intrinsic viscosity of the reaction product was 0.62. Next, the compounds shown in the following table, column 2 in amounts shown in the following table, column 3 were added to the reaction product and stirred for 2 minutes under atmospheric pressure to mix the same with the reaction product, the mixtures were reacted under a reduced pressure of 20 mm. Hg for 2 minutes and further reacted under a highly reduced pressure of 0.2–0.3 mm. Hg for 15 minutes. The intrinsic viscosities and melting point of the obtained products were shown in the following table, columns 4 and 5, respectively.

A control in the following table showed an intrinsic viscosity and a melting point of a polymer obtained by heat treatment same as above except adding any additive.

TABLE 6

| Ex. No. | Carbonate | Adding Amount (part) | Intrinsic Viscosity of Polymers Immediately before Adding | Intrinsic viscosity of Polymers upon Completion of the Reaction after Adding | Softening Point of Polymers upon Completion of the Reaction after Adding (° C.) |
|---|---|---|---|---|---|
| 25 | $C_3H_7$—⌬—O—C(=O)—O—⌬—$C_3H_7$ | 1.5 | 0.62 | 0.93 | 260.1 |
| 26 | $C_2H_5$—⌬($C_2H_5$)—O—C(=O)—O—⌬($C_2H_5$)—$C_2H_5$ | 1.6 | 0.62 | 0.99 | 259.6 |
| 27 | ⌬($C_5H_{11}$)—O—C(=O)—O—⌬($C_5H_{11}$) | 1.8 | 0.62 | 0.97 | 259.7 |
| 28 | ⟨H⟩—⌬—O—C(=O)—O—⌬—⟨H⟩ | 1.9 | 0.62 | 0.90 | 260.9 |
| 29 | Cl—⌬—O—C(=O)—O—⌬—Cl | 1.4 | 0.62 | 1.10 | 258.7 |
| 30 | ⌬(Cl)—O—C(=O)—O—⌬(Cl) | 1.4 | 0.62 | 1.01 | 257.9 |
| 31 | ⌬($C_2H_5$)—O—C(=O)—O—⌬(Cl) | 1.4 | 0.62 | 1.00 | 259.4 |
| 32 | $C_6H_{13}$—⌬—O—C(=O)—O—⌬(Cl) | 1.9 | 0.62 | 0.93 | 260.6 |
| Control | | | 0.62 | 0.69 | 261.7 |

Examples 25–32

A reactor equipped with a fractionating column was charged with 97 parts of dimethyl terephthalate, 69 parts of ethylene glycol, 0.08 part of calcium acetate and 0.04 part of antimony trioxide and heated. The temperature inside the reactor rose gradually and when it reached 230° C. distilling off of methanol stopped. Next, the contents of the reactor were transferred to another reactor, and another reactor was immersed in a salt bath at 275° C., followed by distilling off of excess ethylene glycol While certain preferred embodiments have been illustrated by way of specific example, it is to be understood that the present invntion is in no way to be deemed as limited thereto, but should be construed as broadly as all or any equivalents thereof.

What is claimed is:
1. A process for the preparation of substantially linear highly polymerized carboxylic acid esters prepared by removing, from a 1,2- or 1,3-glycol ester of a dibasic acid or a hydroxy acid or its low condensate in a condensation polymerization, at least one type of glycol selected from the group consisting of 1,2- and 1,3-glycols, said process characterized by the sole addition of a carbonate derivative of a monovalent phenol selected from the formulae:

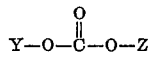 (1)

and

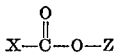 (2)

wherein Y and Z are selected from the group consisting of lower alkyl radicals having from 1 to 6 carbon atoms, cyclohexyl radicals, naphthyl radicals, phenyl radicals and substituted phenyl radicals wherein said substitution is selected from the lower alkyl groups having from 1 to 6 carbon atoms, phenyl, cyclohexyl and halogen radicals; and X is selected from halogen and thio-organic radicals of the formula Y—S— wherein Y is as defined above; at least Y or Z being selected from the group consisting of phenyl, naphthyl and substituted phenyl radicals wherein said substitution is as defined above; to a molten polyester having an intrinsic viscosity of at least 0.2 as calculated from the measured value in orthochlorophenol solvent at 35° C., the condensation polymerization being conducted under conditions whereby the reaction mixture is maintained in its molten state at a subatmospheric pressure.

2. The process of claim 1 wherein the carbonate derivative of monovalent phenol is diphenyl carbonate.

3. The process of claim 1 wherein the carbonate derivative of monovalent phenol is di-ortho-tolyl carbonate.

4. The process of claim 1 wherein the mol percent of the said carbonate derivative added, to the total mol number of the acid component constituting the polyester, is no more than the value of y calculated from the equation $$y = -2x^3 + 9x^2 - 17x + 13.5$$

wherein $x$ is a positive number of 0.2—1.5 and represents the intrinsic viscosity of the reaction product (polyester) in the system at the time the said carbonate derivative is added.

5. The process of claim 1, wherein said carbonate derivative of a monovalent phenol is added to the molten polyester having an intrinsic viscosity of at least 0.6 as calculated from the measured value in orthochlorophenol solvent at 35° C.

6. The process of claim 1 wherein, during the condensation polymerization step of the polyester-forming reaction of at least one acid component selected from the group consisting of dibasic acids and their functional derivatives with at least one glycol component selected from the group consisting of 1,2- and 1,3-glycols and their functional derivatives, after the intrinsic viscosity of the reaction product as calculated from the measured value in orthochlorophenol solvent at 35° C. reached at least 0.2, a carbonate derivative of a moonvalent phenol is added to the said reaction product.

7. The process of claim 1 wherein said molten polyester comprised a remelted solid polyester having an intrinsic viscosity of at least 0.2.

8. The process of claim 1 wherein Y may further contain one or more carbonate residues of a monovalent phenol selected from the formulae:

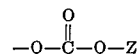

and

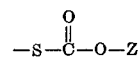

wherein Z is as defined above.

References Cited

FOREIGN PATENTS 391,544 2/1964 Japan.
6407013 12/1964 Netherlands.

WILLIAM H. SHORT, Primary Examiner.

M. GOLDSTEIN, Assistant Examiner.

U.S. Cl. X.R.

260—47

UNITED STATES PATENT OFFICE
CERTIFICATE OF CORRECTION

Patent No. 3,444,141 May 13, 1969

Takeo Shima

It is certified that error appears in the above identified patent and that said Letters Patent are hereby corrected as shown below:

Column 3, line 44, "component" should read -- components --. Column 10, TABLE 2, Example No. 2, under "Softening Point (° C.)", "258" should read -- 258.6 --. Column 16, line 31, "an an" should read -- and an --. Column 17, line 16, "0.01-" should read -- 0.1- --; line 15, "200" should read -- 20 --. Column 20, line 15, "moonvalent" should read -- monovalent --.

Signed and sealed this 31st day of March 1970.

(SEAL)
Attest:

Edward M. Fletcher, Jr.
Attesting Officer

WILLIAM E. SCHUYLER, JR.
Commissioner of Patents